(12) United States Patent
Ito

(10) Patent No.: US 12,458,923 B2
(45) Date of Patent: Nov. 4, 2025

(54) CARBON DIOXIDE RECOVERY DEVICE

(71) Applicant: DENSO CORPORATION, Kariya (JP)

(72) Inventor: Takamasa Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 18/328,850

(22) Filed: Jun. 5, 2023

(65) Prior Publication Data

US 2023/0398489 A1 Dec. 14, 2023

(30) Foreign Application Priority Data

Jun. 14, 2022 (JP) .................. 2022-095807

(51) Int. Cl.
*B01D 53/22* (2006.01)
*B01D 53/32* (2006.01)

(52) U.S. Cl.
CPC ........ *B01D 53/326* (2013.01); *B01D 2221/16* (2013.01); *B01D 2257/504* (2013.01); *B01D 2259/80* (2013.01)

(58) Field of Classification Search
CPC .............. B01D 53/326; B01D 2221/16; B01D 2257/504; B01D 2259/80
See application file for complete search history.

(56) References Cited

U.S. PATENT DOCUMENTS

| | | | | |
|---|---|---|---|---|
| 2014/0332405 A1* | 11/2014 | Tamhankar | ............... | C01B 3/50 205/763 |
| 2016/0288043 A1* | 10/2016 | Meirav | .................. | B01D 53/50 |
| 2017/0106330 A1* | 4/2017 | Gebald | ............... | B01D 53/0423 |
| 2017/0113182 A1 | 4/2017 | Voskian et al. | | |
| 2020/0023307 A1 | 1/2020 | Voskian et al. | | |
| 2020/0171925 A1* | 6/2020 | Matsumoto | ........ | B01D 53/0407 |
| 2022/0118401 A1* | 4/2022 | Umeda | ..................... | C25B 13/02 |
| 2022/0176310 A1* | 6/2022 | Suter | .................. | B01D 53/0438 |
| 2022/0184552 A1 | 6/2022 | Voskian et al. | | |
| 2022/0226767 A1* | 7/2022 | Matsumoto | ........ | B01D 53/0446 |
| 2022/0362708 A1 | 11/2022 | Voskian et al. | | |
| 2023/0201759 A1* | 6/2023 | Spiteri | ............... | B01D 53/0476 95/96 |
| 2023/0211276 A1* | 7/2023 | Spiteri | ............... | B01J 20/28052 95/139 |

(Continued)

FOREIGN PATENT DOCUMENTS

JP 2018-533470 A 11/2018

*Primary Examiner* — Anthony R Shumate
(74) *Attorney, Agent, or Firm* — Harness, Dickey & Pierce, P.L.C.

(57) ABSTRACT

A carbon dioxide recovery device includes: an adsorption unit that includes a plurality of electrochemical cells, each of which includes a working electrode and a counter electrode; a receiver that receives the adsorption unit; a plurality of gas inlets, each of which is provided to the receiver and is configured to introduce a subject gas containing carbon dioxide; and a plurality of doors, each of which is configured to open and close a corresponding one of the gas inlets. The gas inlets are respectively configured to introduce the subject gas into an inside of the receiver in a corresponding direction perpendicular to a cell stacking direction of the electrochemical cells and are configured to introduce the subject gas into the receiver from all around the receiver along a circumferential direction of the receiver that is perpendicular to the cell stacking direction.

6 Claims, 12 Drawing Sheets

(56) References Cited

U.S. PATENT DOCUMENTS

2023/0383429 A1* 11/2023 Takezaki .............. B01D 53/326
2023/0415089 A1* 12/2023 Janett ................. B01D 53/0438
2024/0050885 A1*  2/2024 Cully ................. B01J 20/28038
2024/0157297 A1*  5/2024 Elenowitz ............. B01D 53/96

* cited by examiner

CARBON DIOXIDE RECOVERY DEVICE

CROSS REFERENCE TO RELATED APPLICATION

This application is based on and incorporates herein by reference Japanese Patent Application No. 2022-95807 filed on Jun. 14, 2022.

TECHNICAL FIELD

The present disclosure relates to a carbon dioxide recovery device that is configured to recover carbon dioxide from a carbon dioxide containing gas.

BACKGROUND

Previously, there has been proposed a gas separation system that separates carbon dioxide from carbon dioxide containing gas, such as atmospheric gas, through an electrochemical reaction. In the previously proposed gas separation system, a carbon dioxide adsorbent, which can adsorb the carbon dioxide, is provided to a working electrode of an electrochemical cell. The carbon dioxide adsorbent is an electroactive species and can switch its operation between adsorption of the carbon dioxide at the carbon dioxide adsorbent and desorption of the carbon dioxide from the carbon dioxide adsorbent by changing an electric potential difference between the working electrode and a counter electrode.

In the above-described technique, the carbon dioxide containing gas flows along a surface of the carbon dioxide adsorbent shaped in a plate form, so that the carbon dioxide adsorbent adsorbs the carbon dioxide contained in the carbon dioxide containing gas. In a case where diffusion of the carbon dioxide containing gas along the surface of the carbon dioxide adsorbent is insufficient, the adsorption of the carbon dioxide to the carbon dioxide adsorbent is limited, and thereby the adsorption performance is deteriorated.

SUMMARY

This section provides a general summary of the disclosure, and is not a comprehensive disclosure of its full scope or all of its features.

According to the present disclosure, there is provided a carbon dioxide recovery device that is configured to separate and recover carbon dioxide from a subject gas which contains the carbon dioxide. The carbon dioxide recovery device includes an adsorption unit, a receiver, a plurality of gas inlets and a plurality of doors. The adsorption unit includes a plurality of electrochemical cells which are stacked in a cell stacking direction. The receiver receives the adsorption unit. Each of the plurality of gas inlets is provided to the receiver and is configured to introduce the subject gas into the receiver. Each of the plurality of doors is configured to open and close a corresponding one of the plurality of gas inlets and includes: a base plate that is configured to cover the corresponding one of the plurality of gas inlets; and a support coupler that is configured to support the base plate relative to the receiver. The plurality of gas inlets are respectively configured to introduction of the subject gas into the receiver in a corresponding direction perpendicular to the cell stacking direction of the plurality of electrochemical cells and are configured to introduce the subject gas into the receiver from all around the receiver along a circumferential direction of the receiver that is perpendicular to the cell stacking direction of the plurality of electrochemical cells.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
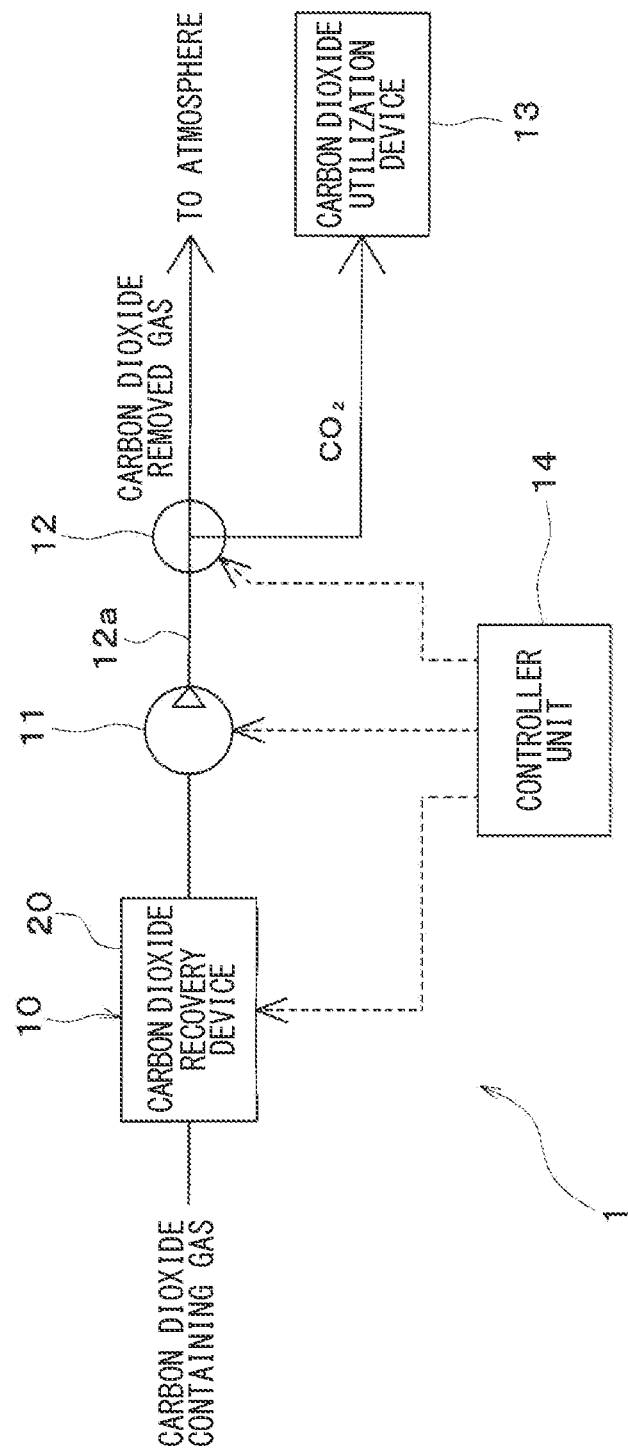
FIG. 1 is a schematic diagram showing an overall structure of a carbon dioxide recovery system of a first embodiment.

Previously, there has been proposed a gas separation system that separates carbon dioxide from carbon dioxide containing gas, such as atmospheric gas, through an electrochemical reaction. In the previously proposed gas separation system, a carbon dioxide adsorbent, which can adsorb the carbon dioxide, is provided to a working electrode of an electrochemical cell. The carbon dioxide adsorbent is an electroactive species and can switch its operation between adsorption of the carbon dioxide at the carbon dioxide adsorbent and desorption of the carbon dioxide from the carbon dioxide adsorbent by changing an electric potential difference between the working electrode and a counter electrode.

In the above-described technique, the carbon dioxide containing gas flows along a surface of the carbon dioxide adsorbent shaped in a plate form, so that the carbon dioxide adsorbent adsorbs the carbon dioxide contained in the carbon dioxide containing gas. In a case where diffusion of the carbon dioxide containing gas along the surface of the carbon dioxide adsorbent is insufficient, the adsorption of the carbon dioxide to the carbon dioxide adsorbent is limited, and thereby the adsorption performance is deteriorated.

With respect to this issue, it is conceivable to use a fan, which blows the carbon dioxide containing gas, in order to facilitate the diffusion and the flow of the carbon dioxide containing gas along the surface of the carbon dioxide adsorbent. However, the energy for driving the fan is required, and thereby the energy efficiency may possibly be deteriorated.

According to the present disclosure, there is provided a carbon dioxide recovery device that is configured to separate and recover carbon dioxide from a subject gas which contains the carbon dioxide, the carbon dioxide recovery device including:

an adsorption unit that includes a plurality of electrochemical cells which are stacked in a cell stacking direction, wherein each of the plurality of electrochemical cells includes:
a working electrode that is configured to adsorb the carbon dioxide from the subject gas and also desorb the carbon dioxide through an electrochemical reaction; and
a counter electrode that is configured to transfer an electron between the counter electrode and the working electrode;
a receiver that receives the adsorption unit;
a plurality of gas inlets, each of which is provided to the receiver and is configured to introduce the subject gas into the receiver; and
a plurality of doors, each of which is configured to open and close a corresponding one of the plurality of gas inlets and includes:
a base plate that is configured to cover the corresponding one of the plurality of gas inlets; and
a support coupler that is configured to support the base plate relative to the receiver, wherein:
the plurality of gas inlets are respectively configured to introduction of the subject gas into the receiver in a corresponding direction perpendicular to the cell stacking direction of the plurality of electrochemical cells and are configured to introduce the subject gas into the receiver from all around the receiver along a circumferential direction of the receiver that is perpendicular to the cell stacking direction of the plurality of electrochemical cells.

With the above-described configuration, the subject gas can be introduced into the adsorption unit regardless of a flow direction of the subject gas into the adsorption unit. Therefore, it is possible to reduce the energy required for introducing the subject gas into the adsorption unit. As a result, the energy, which is required for the carbon dioxide recovery, can be reduced.

Hereinafter, embodiments of the present disclosure will be described with reference to the drawings. In each of the following embodiments, portions, which are the same or equivalent to each other, will be indicated by the same reference signs.

First Embodiment

Hereinafter, a first embodiment of the present disclosure will be described with reference to the drawings. As shown in FIG. 1, a carbon dioxide recovery device 10 of the present embodiment is installed at a carbon dioxide recovery system 1. The carbon dioxide recovery system 1 includes the carbon dioxide recovery device 10, a pump 11, a passage switching valve 12, a carbon dioxide utilization device 13 and a controller unit 14.

The carbon dioxide recovery device 10 is a device that is configured to separate and recover carbon dioxide from a subject gas (supply gas) that is a subject to be processed by the carbon dioxide recovery device 10. The carbon dioxide recovery device 10 includes an adsorption unit 100 which is configured to adsorb and desorb the carbon dioxide.

The subject gas is a carbon dioxide containing gas that contains the carbon dioxide. The subject gas contains other gases that are other than the carbon dioxide. The subject gas may be the atmospheric gas or a high concentration gas that has a carbon dioxide concentration which is higher than a carbon dioxide concentration of the atmospheric gas. The high concentration gas is discharged from, for example, an internal combustion engine or a factory. The subject gas of the present embodiment is the atmospheric gas.

The carbon dioxide recovery device 10 is supplied with the atmospheric gas and discharges: an exhaust gas (hereinafter referred to as a carbon dioxide removed gas) left after recovering of the carbon dioxide from the atmospheric gas; or the carbon dioxide recovered from the atmospheric gas. The structure of the carbon dioxide recovery device 10 will be described later in detail.

The pump 11 is configured to discharge the carbon dioxide or the carbon dioxide removed gas from the carbon dioxide recovery device 10. In the present embodiment, the pump 11 is arranged on a downstream side of the carbon dioxide recovery device 10 in a gas flow direction.

The passage switching valve 12 is a three-way valve that is configured to switch a passage (hereinafter referred to as a discharged gas passage 12a) of the discharged gas which is discharged from the carbon dioxide recovery device 10. In a case where the carbon dioxide removed gas is discharged from the carbon dioxide recovery device 10, the passage switching valve 12 switches the discharged gas passage 12a to the atmosphere side. In contrast, in another case where the carbon dioxide is discharge from the carbon dioxide recovery device 10, the passage switching valve 12 switches the discharged gas passage 12a to the carbon dioxide utilization device 13 side.

The carbon dioxide utilization device 13 is a device for utilizing the carbon dioxide. A storage tank, which stores the carbon dioxide, or a converter device, which converts the carbon dioxide into a fuel, may be used as the carbon dioxide utilization device 13. A device, which converts the carbon dioxide into a hydrocarbon fuel, such as methane, may be used as the converter device. The hydrocarbon fuel may be a fuel, which is in a gas state under the normal temperature and pressure (NTP), or a fuel, which is in a liquid state under the normal temperature and pressure.

The controller unit 14 includes a well-known microcomputer, which includes a CPU (at least one processor), a ROM, and a RAM, and peripheral circuits thereof. The controller unit 14 performs various calculations and processes based on a control program stored in the ROM and controls operations of various control subject devices. The controller unit 14 of the present embodiment performs the control of the operation of the carbon dioxide recovery device 10, the control of the operation of the pump 11, and the passage switching control of the passage switching valve 12.

Figure 2:
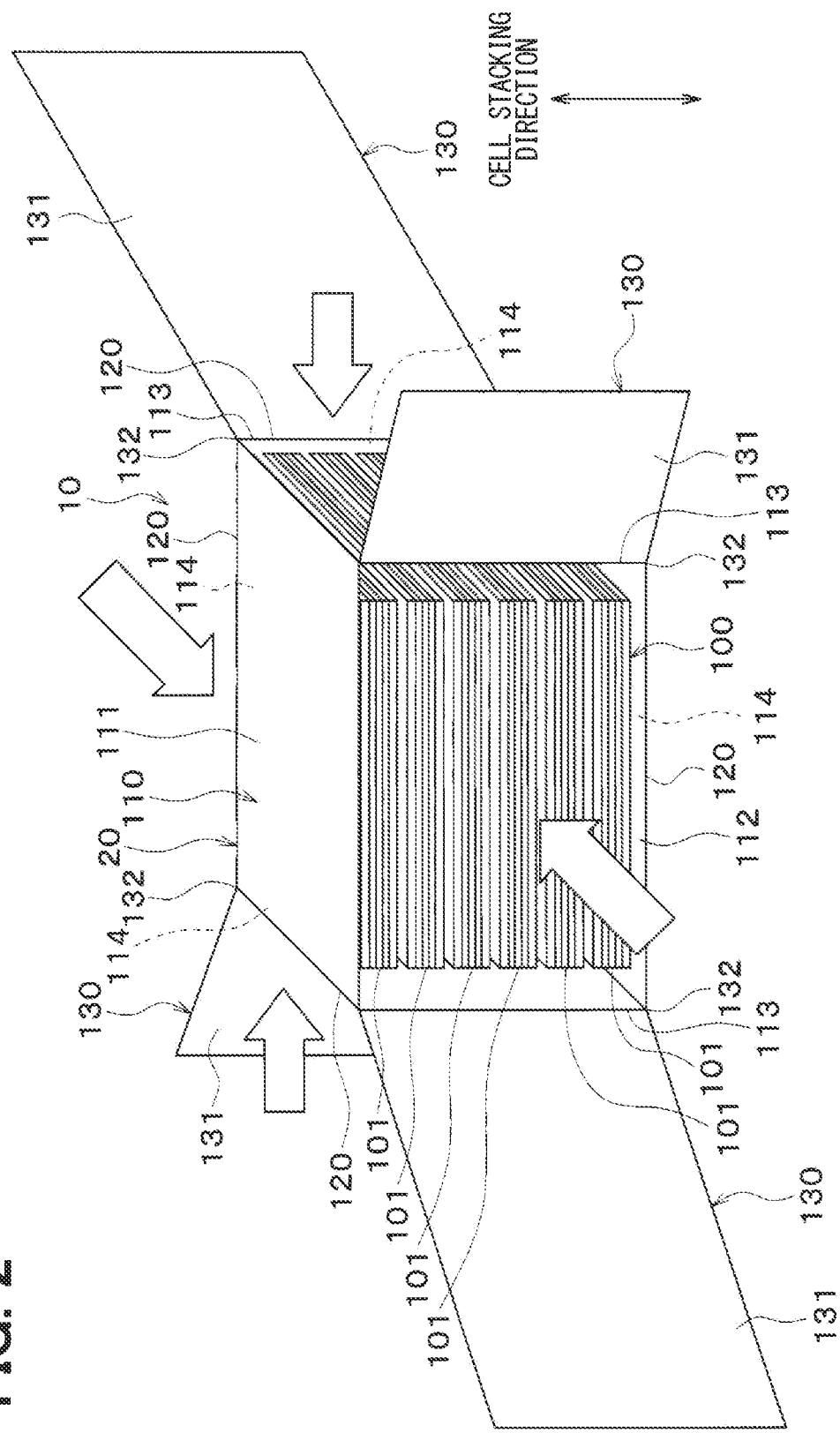
FIG. 2 is a perspective view of a carbon dioxide recovery device of the first embodiment.
Figure 3:
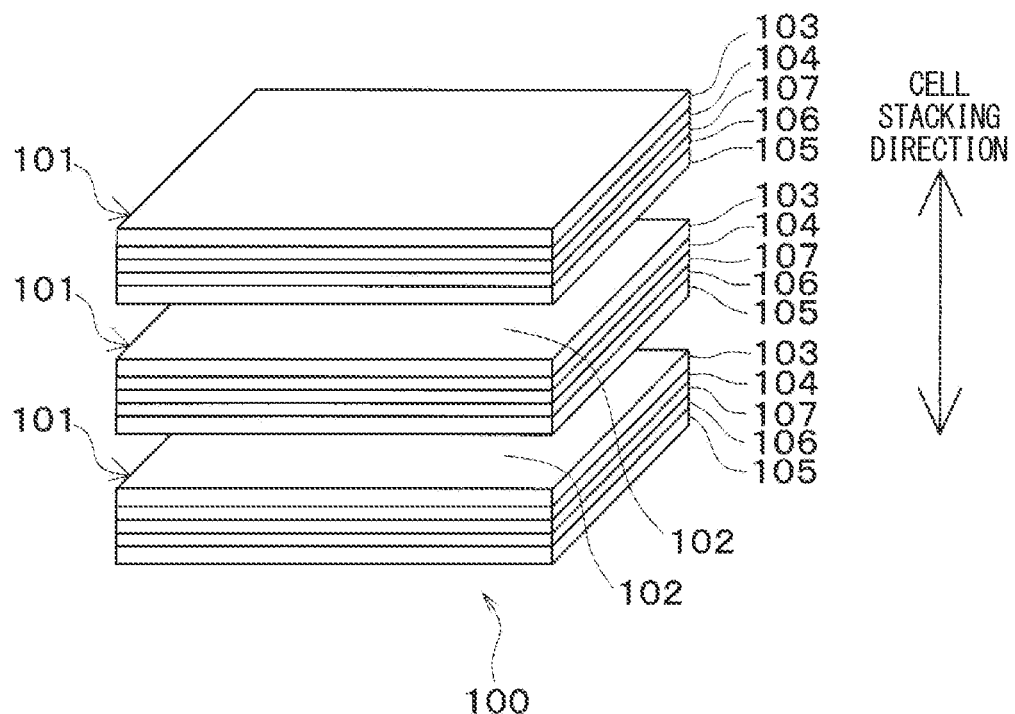
FIG. 3 is a perspective view of a plurality of electrochemical cells which are in a stacked state according to the first embodiment.
Figure 4:
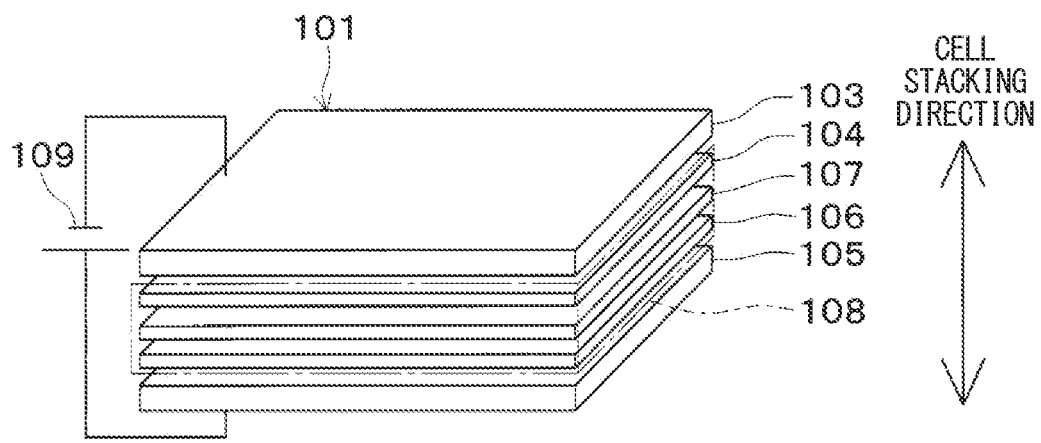
FIG. 4 is a perspective view of the electrochemical cell of the first embodiment.

Next, the carbon dioxide recovery device 10 of the present embodiment will be described with reference to FIGS. 2 to 4. A top-to-bottom direction of each of FIGS. 2 to 4 is a cell stacking direction of a plurality of electrochemical cells 101, in which the electrochemical cells 101 are stacked. As shown in FIG. 2, the carbon dioxide recovery device 10 includes a recovery unit 20, and the recovery unit 20 includes the adsorption unit 100, a receiver 110 and a plurality of doors (also referred to as opening and closing doors) 130.

The adsorption unit 100 includes the plurality of electrochemical cells 101. Details of each of the electrochemical cells 101 will be described later. The electrochemical cells 101 are received in the receiver 110. The carbon dioxide recovery device 10 is configured to adsorb and desorb the carbon dioxide through an electrochemical reaction at the electrochemical cells 101 to separate and recover the carbon dioxide from the supply gas.

The receiver 110 includes: a first base portion 111; a second base portion 112 which is spaced from the first base portion 111; and a plurality of connecting portions 113, each of which joins between the first base portion 111 and the second base portion 112. In the present embodiment, each of the first base portion 111 and the second base portion 112 is shaped in a rectangular plate form that extends in a direction perpendicular to the cell stacking direction of the electrochemical cells 101. The second base portion 112 is arranged in parallel with the first base portion 111.

Each of the connecting portions 113 joins between a corresponding one of apexes of the rectangular form of the first base portion 111 and a corresponding one of apexes of the rectangular form of the second base portion 112. Therefore, in the present embodiment, the number of the connecting portions 113 of the adsorption unit 100 is four.

The electrochemical cells 101 are stacked at the inside of the receiver 110. Each of the electrochemical cells 101 is shaped in a plate form and is arranged such that a plane of the electrochemical cell 101 is perpendicular to the cell stacking direction.

FIG. 3 shows a state where the electrochemical cells 101 are stacked. FIG. 4 shows one of the electrochemical cells 101. In FIG. 4, the components of the electrochemical cell 101, such as a working electrode collector layer 103, are indicated such that the components are spaced from each other. However, in reality, these components are stacked to contact one another.

As shown in FIG. 3, in a view taken in the cell stacking direction of the electrochemical cells 101, each of the electrochemical cells 101 is shaped in a polygonal form or a circular form. In the present embodiment, in the view taken in the cell stacking direction of the electrochemical cells 101, each of the electrochemical cells 101 is shaped in a rectangular form.

A predetermined gap is formed between each adjacent two of the electrochemical cells 101. The gap, which is formed between each adjacent two of the electrochemical cells 101, forms a gas passage 102, through which the atmospheric gas (serving as the supply gas) flows.

As shown in FIGS. 3 and 4, each of the electrochemical cells 101 includes the working electrode collector layer 103, a working electrode 104, a counter electrode collector layer 105, a counter electrode 106 and a separator 107. Each adjacent two of the electrochemical cells 101 are arranged such that the working electrode collector layer 103 of one of the adjacent two of the electrochemical cells 101 is opposed to the counter electrode collector layer 105 of the other one of the adjacent two of the electrochemical cells 101, while the gas passage 102 is interposed between these electrochemical cells 101.

As shown in FIG. 4, an electrolyte liquid 108, which is an electrolyte material, is interposed between the working electrode 104 and the counter electrode 106. In the present embodiment, the working electrode 104, the counter electrode 106 and the separator 107 are saturated with the electrolyte liquid 108.

The working electrode collector layer 103, the working electrode 104, the counter electrode collector layer 105, the counter electrode 106 and the separator 107 are respectively shaped in a plate form. The electrochemical cell 101 is formed as a laminated body (stack) in which the working electrode collector layer 103, the working electrode 104, the counter electrode collector layer 105, the counter electrode 106 and the separator 107 are stacked. The direction, in which the components, such as the working electrode collector layer 103, of the respective electrochemical cells 101 are stacked, coincides with the cell stacking direction.

The working electrode collector layer 103 is made of a porous electrically conductive material, through which the supply gas containing the carbon dioxide can pass. For example, a metal material or a carbonaceous material may be used as the material of the working electrode collector layer 103 as long as it has the gas permeability and the electric conductivity. In the present embodiment, a metal porous material is used as the material of the working electrode collector layer 103.

The working electrode 104 includes a carbon dioxide adsorbent, an electrically conductive material and a binder. The carbon dioxide adsorbent, the electrically conductive material and the binder are used in a state of a mixture, in which the carbon dioxide adsorbent, the electrically conductive material and the binder are mixed together.

The carbon dioxide adsorbent absorbs the carbon dioxide by receiving electrons and desorbs the adsorbed carbon dioxide by releasing the electrons. For example, polyanthraquinone can be used as the carbon dioxide adsorbent.

The electrically conductive material forms an electrically conductive path to the carbon dioxide adsorbent. For example, a carbon material, such as carbon nanotubes, carbon black, graphene, may be used as the electrically conductive material.

The binder is provided to hold the carbon dioxide adsorbent and the electrically conductive material. For example, electrically conductive resin may be used as the binder. For example, fluorocarbon resin, such as epoxy resin, polytetrafluoroethylene (PTFE), polyvinylidene fluoride (PVDF), which contains, for example, Ag as electrically conductive filler, may be used as the electrically conductive resin.

The counter electrode collector layer 105 is made of an electrically conductive material. For example, a metal material or a carbonaceous material may be used as the material of the counter electrode collector layer 105. In the present embodiment, a metal plate is used as the counter electrode collector layer 105.

The counter electrode 106 includes an electroactive auxiliary material, an electrically conductive material and a binder. Since the electrically conductive material and the binder of the counter electrode 106 have the same configuration as those of the working electrode 104, description of the electrically conductive material and the binder of the counter electrode 106 is omitted for the sake of simplicity. In the present embodiment, the counter electrode 106 is made of a material that has an active substance which becomes an electron donor.

The electroactive auxiliary material of the counter electrode 106 is a supplementary electroactive species that transfers (i.e., supplies or receives) electrons between the supplementary electroactive species and the carbon dioxide adsorbent of the working electrode 104. For example, a metal complex, which enables the electron transfer by changing the valence of metal ions, can be used as the electroactive auxiliary material. This type of metal complex may be, for example, cyclopentadienyl metal complex (e.g., ferrocene, nickelocene or cobaltocene) or porphyrin metal complex. The metal complex may be a polymer or a monomer.

The separator 107 is placed between the working electrode 104 and the counter electrode 106 to separate the working electrode 104 and the counter electrode 106 from each other. The separator 107 is an ion permeable membrane that is dielectric and limits physical contact between the working electrode 104 and the counter electrode 106 to limit electrical short circuiting therebetween while allowing ions to pass through the ion permeable membrane. A cellulose membrane, a polymer, or a composite material made of the polymer and ceramic may be used as the separators 107.

The electrochemical cell 101 is provided with an electric power source 109 that is connected to the working electrode collector layer 103 and the counter electrode collector layer 105. The electric power source 109 can apply a predetermined electric voltage between the working electrode 104 and the counter electrode 106 to change an electric potential difference between the working electrode 104 and the counter electrode 106. The working electrode 104 is a negative electrode, and the counter electrode 106 is a positive electrode.

The electrochemical cell 101 can switch its operation between an adsorption process for adsorbing the carbon dioxide to the working electrode 104 and a desorption process for desorbing the carbon dioxide from the working electrode 104 by changing the electric potential difference between the working electrode 104 and the counter electrode 106. The adsorption process is a charging process for electrically charging the electrochemical cell 101, and the desorption process is a discharging process for electrically discharging the electrochemical cell 101.

In the adsorption process, a first voltage V1 is applied between the working electrode 104 and the counter electrode 106, and electrons are supplied from the counter electrode 106 to the working electrode 104. Under the first voltage V1, the working electrode potential is smaller than the counter electrode potential (i.e., the working electrode potential<the counter electrode potential). The first voltage V1 may be in a range of, for example, 0.5 V to 2.0 V.

In the desorption process, a second voltage V2 is applied between the working electrode 104 and the counter electrode 106, and electrons are supplied from the working electrode 104 to the counter electrode 106. The second voltage V2 is a voltage that is different from the first voltage V1. It is only required that the second voltage V2 is lower than the first voltage V1, and the high/low relationship between the working electrode potential and the counter electrode potential is not limited to any particular one. Specifically, in the desorption process, the working electrode potential may be lower than the counter electrode potential (i.e., the working electrode potential<the counter electrode potential), or the working electrode potential may be equal to the counter electrode potential (i.e., the working electrode potential=the counter electrode potential), or the working electrode potential may be higher than the counter electrode potential (i.e., the working electrode potential>the counter electrode potential).

Next, the electrolyte liquid 108 of the present embodiment will be described. In the carbon dioxide recovery system 1 of the present embodiment, the electrolyte liquid 108 includes a substance that has at least one of addition reaction resistance and replacement reaction resistance relative to at least one of the supply gas, the working electrode 104 and the counter electrode 106. For example, the electrolyte liquid 108 may include a substance that does not cause at least one of an addition reaction and a replacement reaction relative to at least one of the supply gas, the working electrode 104 and the counter electrode 106.

Specifically, the electrolyte liquid 108 may include a substance that has oxidation-reduction reaction resistance relative to at least one of the supply gas, the working electrode 104 and the counter electrode 106 when the voltage is applied between the working electrode 104 and the counter electrode 106. For instance, the electrolyte liquid 108 may include a substance that does not exhibit the oxidation-reduction reaction relative to at least one of the supply gas, the working electrode 104 and the counter electrode 106 when the voltage is applied between the working electrode 104 and the counter electrode 106.

More specifically, the electrolyte liquid 108 may include a substance that has the oxidation-reduction reaction resistance relative to at least one of the supply gas, the working electrode 104 and the counter electrode 106 when a voltage, which is equal to or higher than the first voltage V1 and is equal to or lower than the second voltage V2, is applied between the working electrode 104 and the counter electrode 106. For instance, the electrolyte liquid 108 may include a substance that does not exhibit the oxidation-reduction reaction relative to at least one of the supply gas, the working electrode 104 and the counter electrode 106 when the voltage, which is equal to or higher than the first voltage V1 and is equal to or lower than the second voltage V2, is applied between the working electrode 104 and the counter electrode 106.

Furthermore, the electrolyte liquid 108 may include a substance that has decomposition reaction resistance under the normal temperature and pressure when the voltage is applied between the working electrode 104 and the counter electrode 106. For instance, the electrolyte liquid 108 may include a substance that does not exhibit the decomposition reaction under the normal temperature and pressure when the voltage is applied between the working electrode 104 and the counter electrode 106.

More specifically, the electrolyte liquid 108 may include a substance that has the decomposition reaction resistance when the voltage, which is equal to or higher than the first voltage V1 and is equal to or lower than the second voltage V2, is applied between the working electrode 104 and the counter electrode 106. For instance, the electrolyte liquid 108 may include a substance that does not exhibit the decomposition reaction when the voltage, which is equal to or higher than the first voltage V1 and is equal to or lower than the second voltage V2, is applied between the working electrode 104 and the counter electrode 106.

Furthermore, the electrolyte liquid 108 may include a substance that is stable to the constituent materials of the electrochemical cell 101. That is, the electrolyte liquid 108 may include the substance that has reaction resistance relative to the constituent materials of the electrochemical cell 101.

Furthermore, the electrolyte liquid 108 may include a substance that is less likely to produce volatile products in response to electrochemical reactions. For example, the electrolyte liquid 108 may include a substance that is less likely to produce the volatile products in response to the electrochemical reactions in comparison to the electrolyte liquid that includes 1-ethyl-3-methylimidazolium dicyanamide [Emin][N(CN)$_2$]. Furthermore, the electrolyte liquid 108 may include a substance that does not produce the volatile products in response to the electrochemical reactions.

Furthermore, ionic liquid may be used as the electrolyte liquid 108. The ionic liquid is a liquid salt that is nonvolatile under the normal temperature and pressure.

Referring back to FIG. 2, the receiver 110 of the carbon dioxide recovery device 10 includes a plurality of gas inlets 120 and the plurality of doors 130. Each of the gas inlets 120 serves as an opening through which the atmospheric gas is introduced into the inside of the receiver 110. Each of the gas inlets 120 is placed between the first base portion 111 and the second base portion 112 at the receiver 110.

Each of the doors 130 serves as a door member which opens and closes a corresponding one of the gas inlets 120. Each of the doors 130 includes a base plate 131 and a plurality (two in this example) of support couplers 132. The base plate 131 is a plate member that is configured to cover the corresponding gas inlet 120. A plate surface of the base plate 131 has a shape and a size that enable the base plate 131 to close the corresponding gas inlet 120. The support couplers 132 rotatably support and couple the base plate 131 relative to the receiver 110. The two support couplers 132 are provided to each of the connecting portions 113 of the receiver 110.

Figure 5:
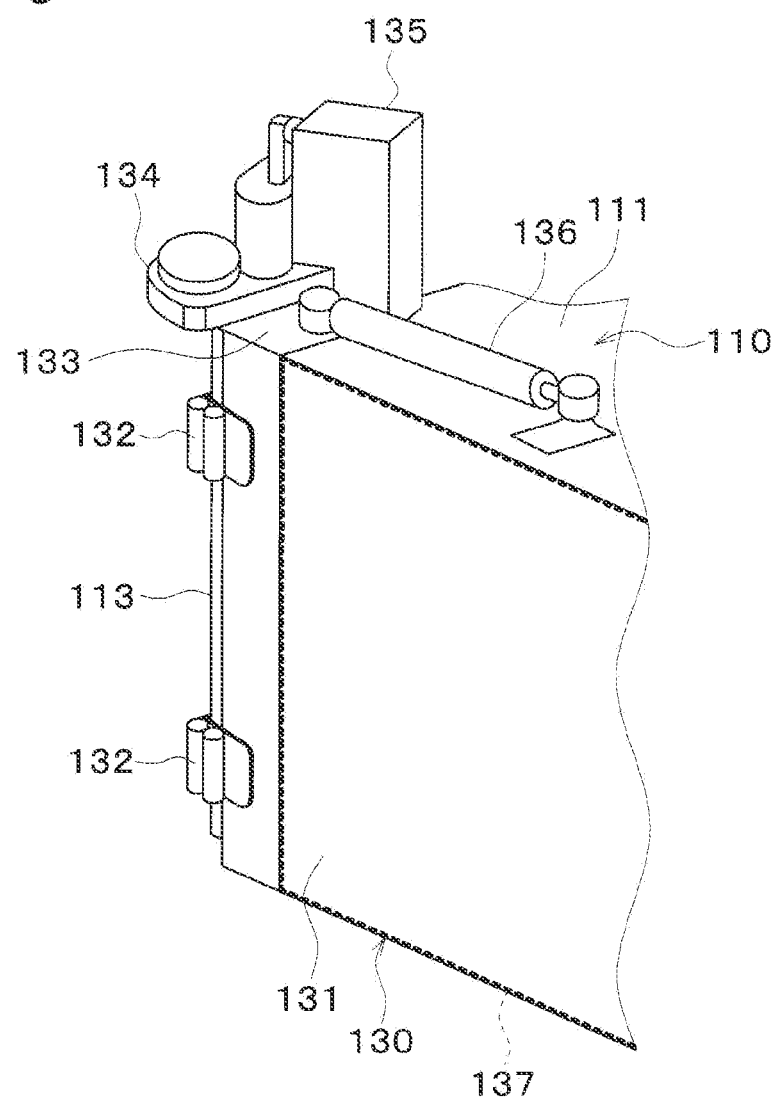
FIG. 5 is an explanatory diagram showing a door of the first embodiment.

As shown in FIG. 5, the base plate 131 of each door 130 is connected to the electric actuator 134 through a corresponding coupling portion 133. The door 130 is driven by the electric actuator 134. The operation of the electric actuator 134 is controlled by a control signal outputted from the controller unit 14. For example, an electric motor may be used as the electric actuator 134. The electric actuator 134 is connected to the receiver 110 through a bracket 135.

The door 130 is rotatably supported relative to the receiver 110 by the support couplers 132. In the present embodiment, a hinge is used as the respective support couplers 132.

A damper member 136, which couples between the door 130 and the receiver 110, is provided at a top surface of the receiver 110. The damper member 136 is an abrupt opening/closing limiter which limits abrupt opening and closing of the door 130 in response to an external factor, such as gusty wind.

A seal element 137 is provided at an outer periphery of a back surface of the base plate 131, i.e., a surface of the base plate 131 which is opposed to the adsorption unit 100. With this configuration, intrusion of the atmospheric gas into the inside of the receiver 110 through a gap between the base plate 131 and the receiver 110 at the time of closing the door 130 can be limited. For example, an O-ring may be used as the seal element 137.

Referring back to FIG. 2, the gas inlets 120 are respectively configured to introduce the atmospheric gas into the receiver 110 in a corresponding direction perpendicular to the cell stacking direction of the electrochemical cells 101 and are configured to introduce the subject gas into the receiver 110 from all around the receiver 110 along a circumferential direction of the receiver 110 that is perpendicular to the cell stacking direction of the electrochemical cells 101. Specifically, the gas inlets 120 are arranged all around the receiver 110 except the portions of the receiver 110, to each of which the support couplers 132 of the corresponding door 130 are coupled. That is, the gas inlets 120 are arranged all around the receiver 110 except the portions of the receiver 110, each of which corresponds to the support couplers 132 of the corresponding door 130. In other words, along the circumferential direction of the receiver 110 that is perpendicular to the cell stacking direction, the gas inlets 120 are respectively arranged at all of circumferential sides of the receiver 110, which are other than the portions of the receiver 110, to each of which the support couplers 132 of the corresponding door 130 are coupled.

Another member(s) may be connected to the portions of the receiver 110, each of which corresponds to the support couplers 132 of the corresponding door 130, to the extent that they do not affect the flow of the atmospheric gas entering from the gas inlets 120. Even in this case, along the circumferential direction of the receiver 110 that is perpendicular to the cell stacking direction, the gas inlets 120 are respectively arranged at all of circumferential sides of the receiver 110, which are other than the portions of the receiver 110, each of which corresponds to the support couplers 132 of the corresponding door 130.

In the present embodiment, an outer shape of the adsorption unit 100 (i.e., an outer shape of the stack of the electrochemical cells 101) is generally a rectangular cuboid form. The receiver 110 is shaped in a rectangular cuboid form that corresponds to the adsorption unit 100. Among six sides of the receiver 110 shaped in the rectangular cuboid form, four sides, which are other than a top surface (top side) and a bottom surface (bottom side) of the receiver 110, are fully opened to form the gas inlets 120, respectively. Specifically, among the six sides of the receiver 110 shaped in the rectangular cuboid form, the four sides, which are parallel with the cell stacking direction, form the gas inlets 120, respectively. At this time, the gas inlet 120 is not formed at the portions of the receiver 110, at each of which the support couplers 132 of the corresponding door 130 are provided.

Here, the receiver 110 includes a plurality of side portions 114, each of which is surrounded by the first base portion 111, the second base portion 112 and corresponding two of the connecting portions 113. The gas inlets 120 are respectively provided to all of the side portions 114 of the receiver 110.

In the present embodiment, the number of the side portions 114 of the receiver 110 is four. Specifically, among the six sides of the receiver 110 shaped in the rectangular cuboid form, the four sides, which are other than the top surface (top side) and the bottom surface (bottom side), form the four side portions 114, respectively. Each of the gas inlets 120 of the present embodiment is formed through substantially the entire extent of the corresponding one of the side portions 114. Specifically, the opening cross-sectional area of each of the gas inlets 120 is slightly smaller than the entire area of the corresponding one of the side portions 114.

In the present embodiment, an inlet of the discharged gas passage 12*a* is connected to at least one of the top surface and the bottom surface of the receiver 110.

Figure 6:
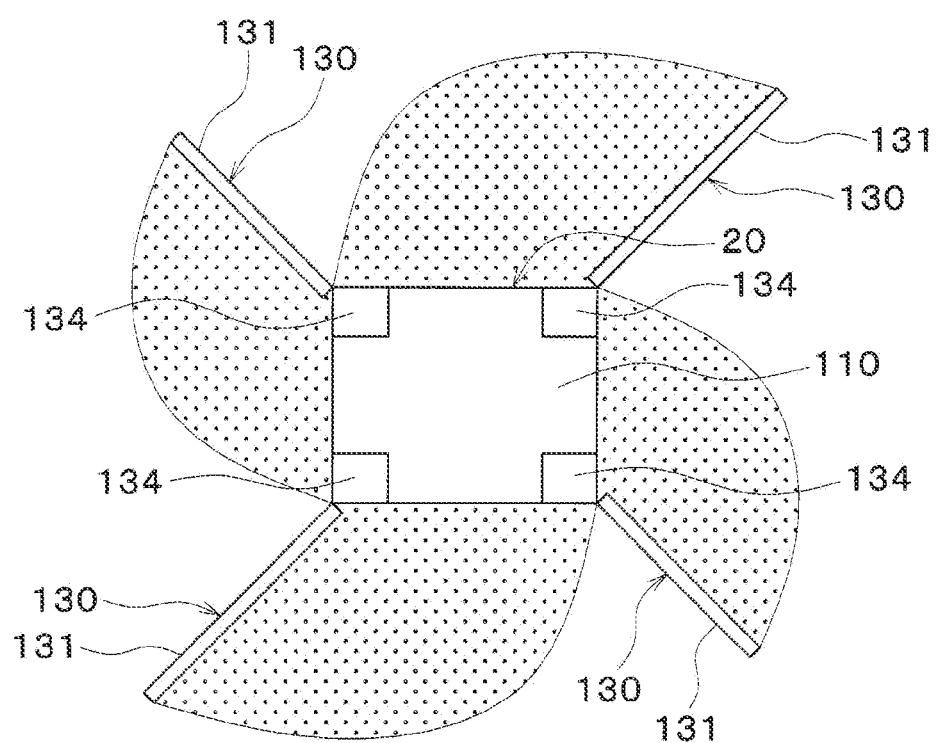
FIG. 6 is an explanatory diagram for explaining an opened state of the doors of the first embodiment.

FIG. 6 is an explanatory diagram indicating the recovery unit 20 of the present embodiment seen in the cell stacking direction, showing a state of the doors 130 at the opening time of the doors 130. Each area of FIG. 6, which is indicated with a dot hatching, indicates a movable range of the corresponding door 130.

As shown in FIG. 6, at the opening time of the doors 130, a plate surface of the base plate 131 of each of the doors 130 is arranged to extend in a direction which extends through a center part of the adsorption unit 100 and is perpendicular to a spacing direction, in which the first base portion 111 and the second base portion 112 are spaced from each other. At the opening time of the door 130, the plate surface of the base plate 131 extends along a radial line which extends from the center part of the adsorption unit 100. In the present embodiment, at the opening time of the door 130, an opening angle of the door 130 is set to be 135° relative to the gas inlet 120.

Figure 7:
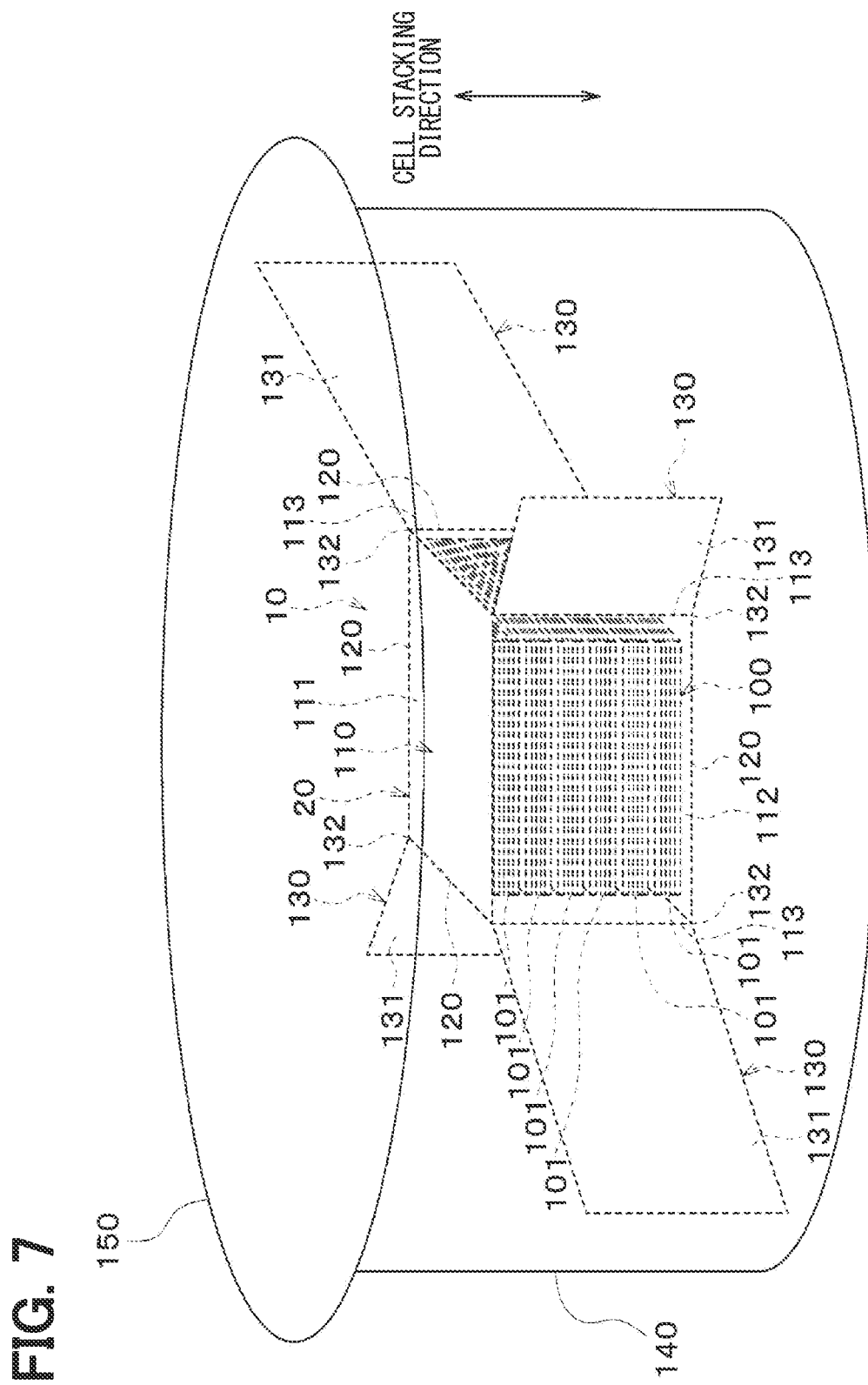
FIG. 7 is a perspective view of the carbon dioxide recovery device of the first embodiment.
Figure 8:
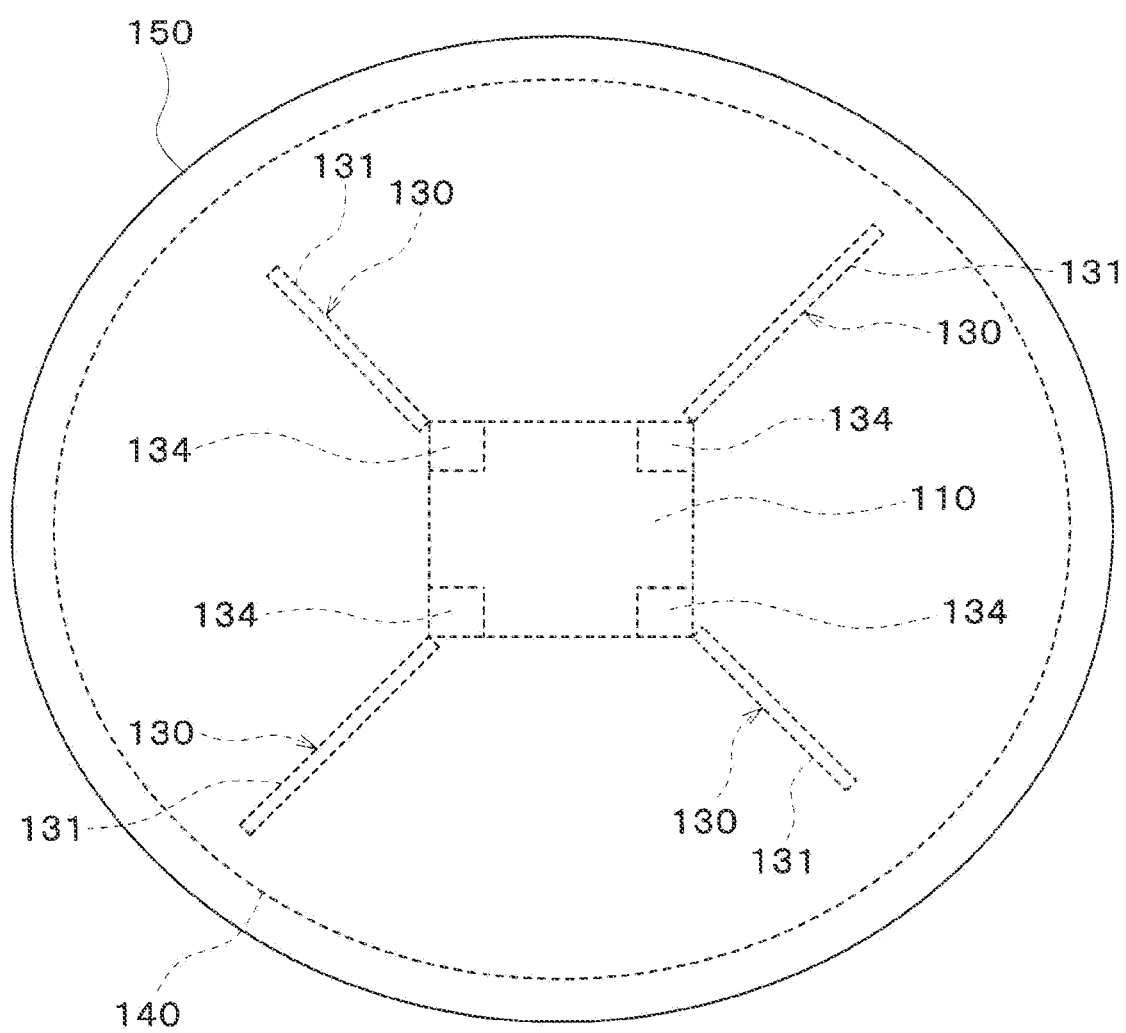
FIG. 8 is a plan view of the carbon dioxide recovery device of the first embodiment.

As shown in FIGS. 7 and 8, a filter 140, which is shaped in a tubular form, is placed on an outer side (radially outer side) of the recovery unit 20. The recovery unit 20 is placed at the inside of the filter 140 shaped in the tubular form. The filter 140 is placed at a position where the filter 140 does not contact the base plates 131 at the opening time of the doors 130. In the present embodiment, the filter 140 is shaped in an elliptical tubular form. The filter 140 may be shaped in another form, such as a cylindrical tubular form, as long as the filter 140 does not contact the doors 130.

A cover 150 is provided at a top part of the recovery unit 20. The cover 150 is a rain shield that limits rain from falling on the recovery unit 20. The cover 150 is shaped in a plate form. In the present embodiment, the cover 150 is shaped in an elliptical plate form. Furthermore, an outer periphery of the cover 150 is placed on the outer side (radially outer side) of the filter 140. The cover 150 may be shaped in another form, such as a circular plate form, as long as the cover 150 can limit the rain from falling on the recovery unit 20.

Next, the operation of the carbon dioxide recovery system 1 of the present embodiment will be described. The carbon dioxide recovery system 1 is configured to execute the adsorption process, a scavenging process and the desorption process. The carbon dioxide recovery system 1 switches the operation in the following order: the adsorption process, the scavenging process, the desorption process, the adsorption process, the scavenging process, the desorption process, and so on. The operation of the carbon dioxide recovery system 1 is controlled by the controller unit 14.

The adsorption process is a process in which the adsorption unit 100 adsorbs the carbon dioxide contained in the supply gas. At the adsorption process, all of the doors 130 of the recovery unit 20 are fully opened. Therefore, the atmospheric gas is introduced into the adsorption unit 100.

At the adsorption process, the voltage, which is applied between the working electrode 104 and the counter electrode 106, is set to the first voltage V1. Therefore, electron donation by the electroactive auxiliary material of the counter electrode 106 and the electron attraction by the carbon dioxide adsorbent of the working electrode 104 can be simultaneously implemented.

The electroactive auxiliary material of the counter electrode 106 releases the electrons and becomes the oxidized state, and the electrons are supplied from the counter electrode 106 to the working electrode 104. The carbon dioxide adsorbent of the working electrode 104 receives the electrons and thereby becomes the reduced state.

The carbon dioxide adsorbent, which is now in the reduced state, has an increased carbon dioxide binding force and binds with and adsorbs the carbon dioxide contained in the supply gas. Thereby, the carbon dioxide recovery device 10 can recover the carbon dioxide from the supply gas.

At the scavenging process, all of the doors 130 of the recovery unit 20 are fully closed, and the pump 11 is actuated. At the scavenging process, the passage switching valve 12 is switched to connect the discharged gas passage 12a to the atmosphere side. Therefore, the gas, which is present in the receiver 110, is discharged to the atmosphere through the discharged gas passage 12a. At this time, the carbon dioxide in the adsorption unit 100 is kept in the state where the carbon dioxide is adsorbed by the carbon dioxide adsorbent of the working electrode 104.

At the desorption process, in the state where all of the doors 130 are kept closed, the passage switching valve 12 is switched to connect the discharged gas passage 12a to the carbon dioxide utilization device 13. At the desorption process, the voltage, which is applied between the working electrode 104 and the counter electrode 106, is set to the second voltage V2. Therefore, the electron donation by the carbon dioxide adsorbent of the working electrode 104 and the electron attraction by the electroactive auxiliary material of the counter electrode 106 can be simultaneously implemented.

The carbon dioxide adsorbent of the working electrode 104 releases the electrons and thereby becomes the oxidized state. The carbon dioxide binding force of the carbon dioxide adsorbent is reduced, so that the carbon dioxide adsorbent desorbs and releases the carbon dioxide. The electroactive auxiliary material of the counter electrode 106 receives the electrons and thereby becomes the reduced state.

The carbon dioxide, which is released from the carbon dioxide adsorbent, is discharged from the adsorption unit 100 and is supplied to the carbon dioxide utilization device 13.

In the carbon dioxide recovery system 1 of the present embodiment, the operational torque (e.g., motor torque), the electric current value or the feedback control amount of the electric actuator 134 at the opening time of the door 130 is sensed. The controller unit 14 senses a sign, which indicates that the door 130 is about to freeze, based on a result of the sensing operation discussed above and shortens a closing time period of the doors 130 (i.e., a time period of the scavenging process and the desorption process). In this way, when the outside temperature is reduced to the low temperature at, for example, the winter time, it is possible to limit sticking of the doors 130 caused by the freezing in the closed state of the doors 130.

As described above, in the carbon dioxide recovery device 10 of the present embodiment, the gas inlets 120, through each of which the atmospheric gas is introduced into the receiver 110, are arranged all around the receiver 110 except the portions of the receiver 110, to each of which the support couplers 132 of the corresponding door 130 are coupled. With this configuration, the atmospheric gas can be introduced into the adsorption unit 100 from all around the adsorption unit 100 regardless of a wind direction (flow direction) of the atmospheric gas. Therefore, the atmospheric gas can be easily introduced into the adsorption unit 100 by the natural wind or the like. This eliminates the need for installing the fan to introduce the atmospheric gas into the adsorption unit 100. Or, even if the fan is installed, there is no need to increase the drive force of the fan. As a result, the energy, which is required for the carbon dioxide recovery, can be reduced.

Furthermore, in the present embodiment, at the opening time of each of the doors 130, the plate surface of the base plate 131 of the door 130 extends along the radial line which extends from the center part of the adsorption unit 100. Therefore, the interference of the inflow of the supply air by the door 130 can be limited.

Second Embodiment

Next, a second embodiment of the present disclosure will be described with reference to the drawing. In the present embodiment, there will be described only points, which are different from the first embodiment.

Figure 9:
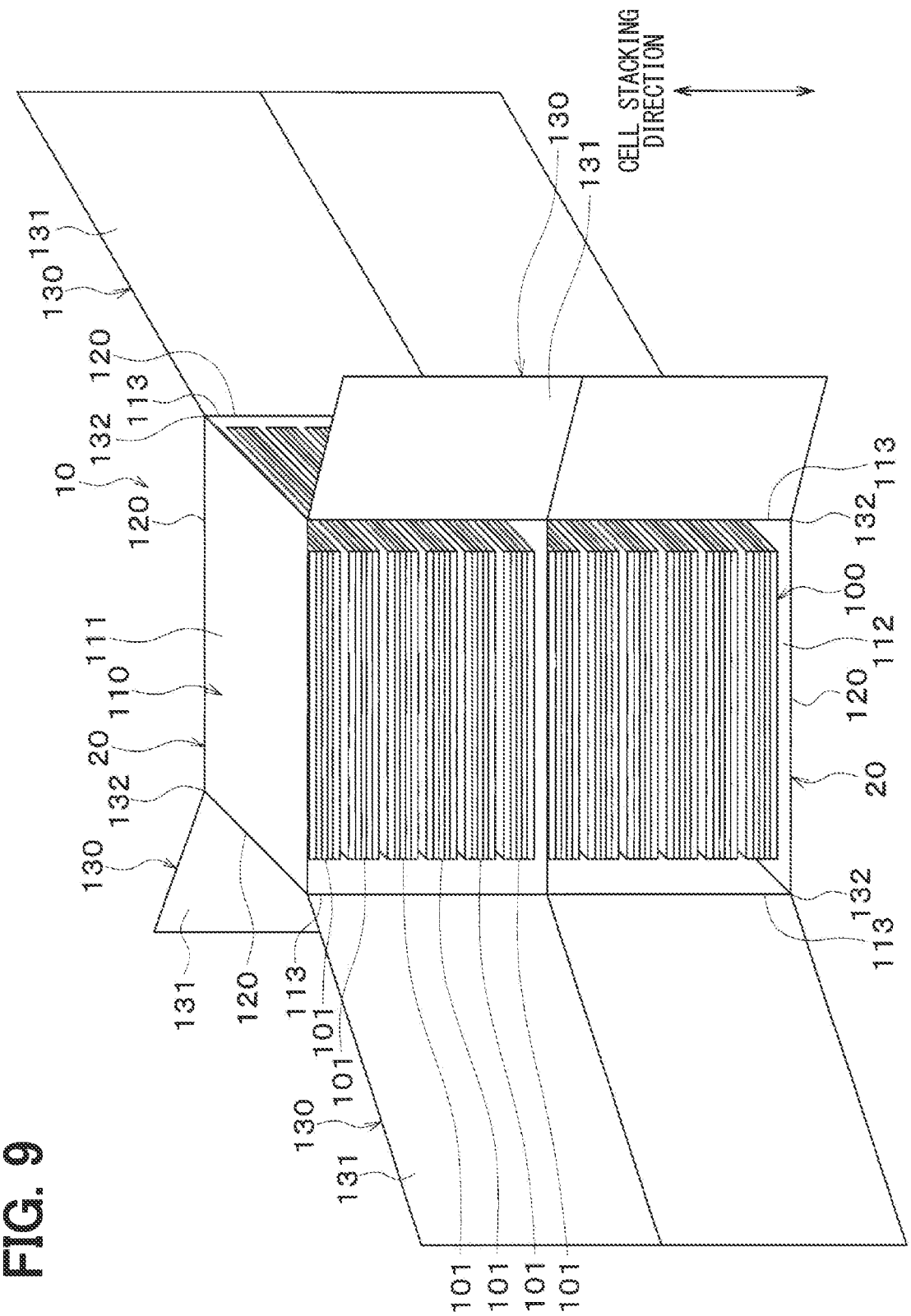
FIG. 9 is a perspective view of a carbon dioxide recovery device of a second embodiment.

As shown in FIG. 9, a carbon dioxide recovery device 10 of the present embodiment includes a plurality (two in this instance) of recovery units 20. The two recovery units 20 are arranged in the cell stacking direction of the electrochemical cells 101.

Here, as a comparative example, it is conceivable to arrange the recovery units 20 in a horizontal direction. In this comparative example, the carbon dioxide removed gas, which is discharged from one of the recovery units 20, may possibly be supplied to the other one of the recovery units 20 which is placed adjacent to the one of the recovery units 20. In this case, the recovery efficiency of the carbon dioxide may possibly be decreased.

In contrast, in the present embodiment, the recovery units 20 are arranged in the cell stacking direction of the electrochemical cells 101. With this configuration, the fresh atmospheric gas can be introduced into the electrochemical cells 101 of all of the recovery units 20. As a result, the recovery efficiency of the carbon dioxide can be improved.

Third Embodiment

Next, a third embodiment of the present disclosure will be described with reference to the drawings. In the present embodiment, there will be described only points, which are different from the first embodiment.

Figure 10:
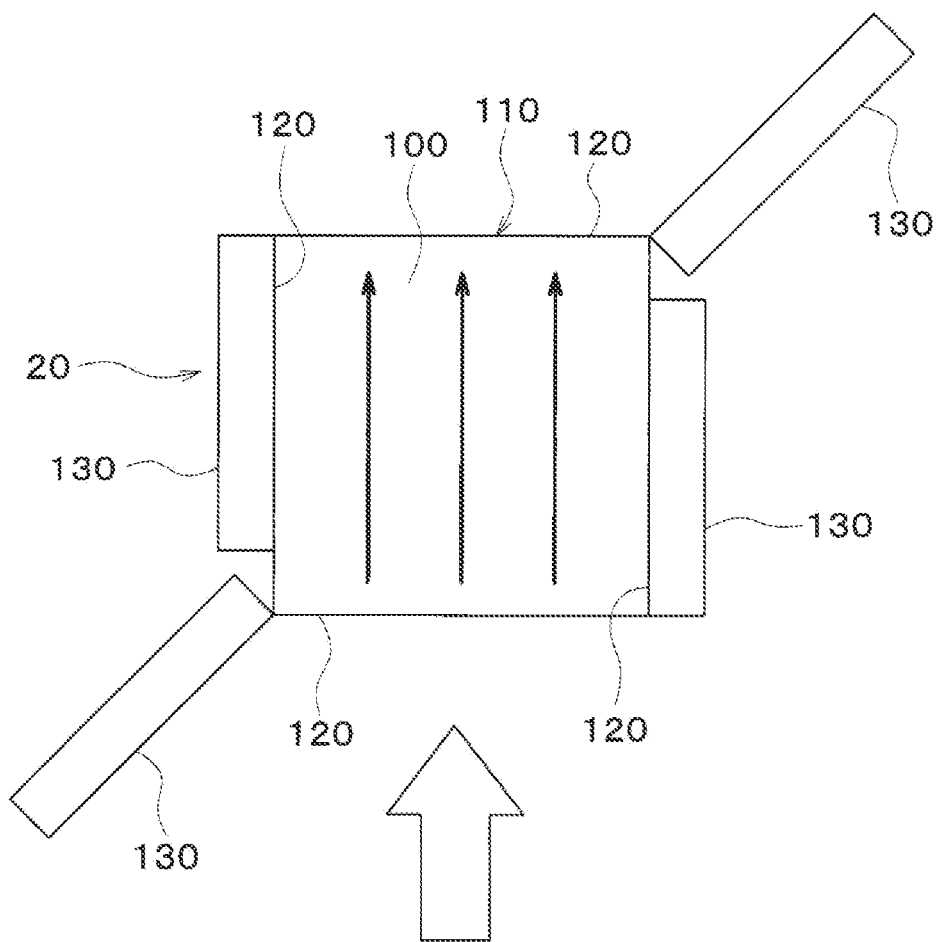
FIG. 10 is an explanatory diagram of a carbon dioxide recovery device of a third embodiment.

As shown in FIG. 10, a carbon dioxide recovery device 10 of the present embodiment is configured such that only some of a plurality of doors 130 are opened. Specifically, in the carbon dioxide recovery device 10 of the present embodiment, among four doors 130, two doors 130, which are opposed to each other, are opened, and the remaining two doors 130 are closed.

One of the two opened doors 130 serves as an inflow portion, through which the atmospheric gas is introduced into the receiver 110. The other one of the two opened doors 130 serves as an outflow portion from which the carbon dioxide removed gas or the like is discharged from the inside of the receiver 110.

In the present embodiment, the carbon dioxide recovery device 10 is placed in an environment where the wind always flows in the same direction (e.g., a single direction at any particular time period). The doors 130 to be opened are set according to the wind direction of the atmospheric gas. Specifically, the two doors 130 are selected and are opened such that a flow direction (see black solid arrows in FIG. 10) of the gas from the inflow portion to the outflow portion coincides with a wind direction (see a blank arrow in FIG. 10) of the atmospheric gas. The remaining two doors 130 are kept closed.

Figure 11:
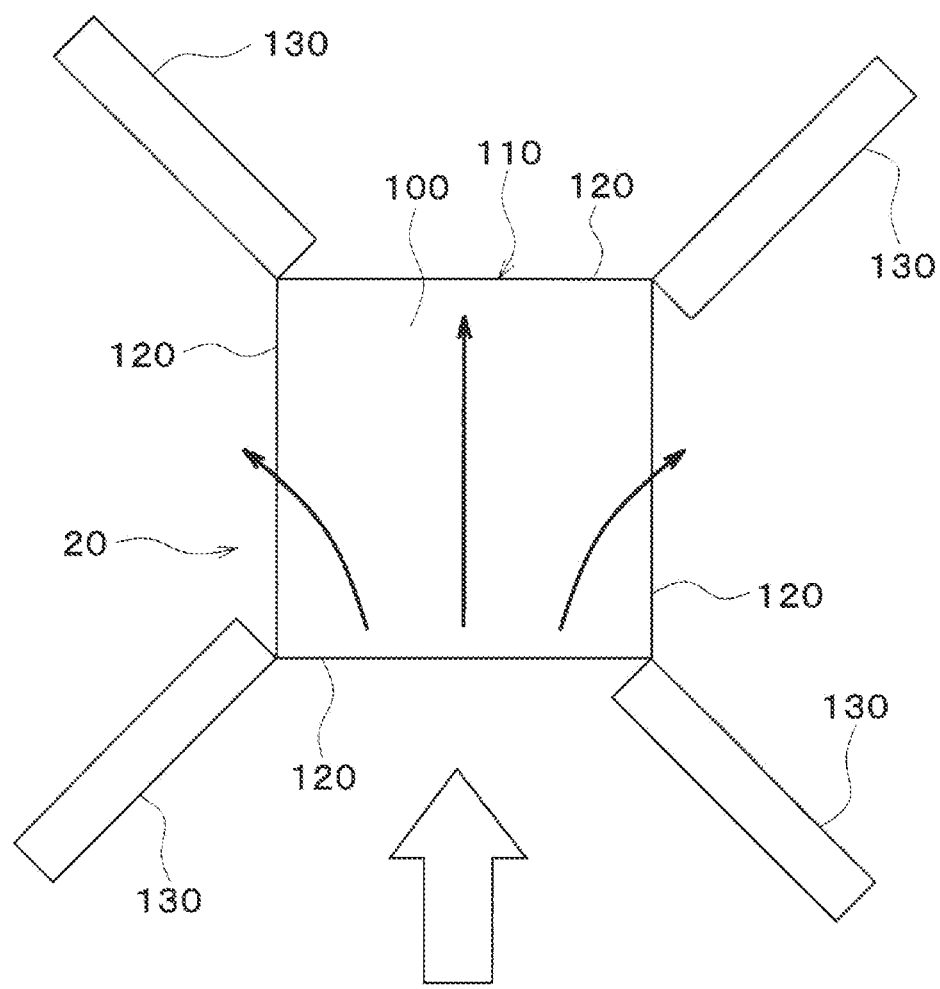
FIG. 11 is an explanatory diagram of a carbon dioxide recovery device of a comparative example.

Now, as a comparative example, FIG. 11 shows a configuration in which all of the doors 130 of the carbon dioxide recovery device 10 are opened. In the comparative example, as indicated by arrows in FIG. 11, portions of the atmospheric gas, which is introduced from the door 130 placed on the front side (the lower side of FIG. 11) into the receiver 110, may possibly escape from two doors 130 placed on the lateral sides (the left and right sides of FIG. 11). This may possibly result in a decrease in the flow rate of the atmospheric gas, which passes through the electrochemical cells 101.

In contrast, in the present embodiment, among the plurality of doors 130, only some of the doors 130 are opened. Therefore, it is possible to coincide the wind direction of the atmospheric gas with the flow direction of the atmospheric gas supplied to the electrochemical cells 101. Furthermore, by closing the remaining doors 130, it is possible to limit the escape of the introduced atmospheric gas from the receiver 110 to the lateral sides, and thereby it is possible to increase the flow rate of the atmospheric gas which passes through the electrochemical cells 101. This is particularly effective in the case where the carbon dioxide recovery system 1 is placed in the environment where the wind always flows in the same direction like in this embodiment.

Fourth Embodiment

Next, a fourth embodiment of the present disclosure will be described with reference to the drawing. In the present embodiment, there will be described only points, which are different from the first embodiment.

Figure 12:
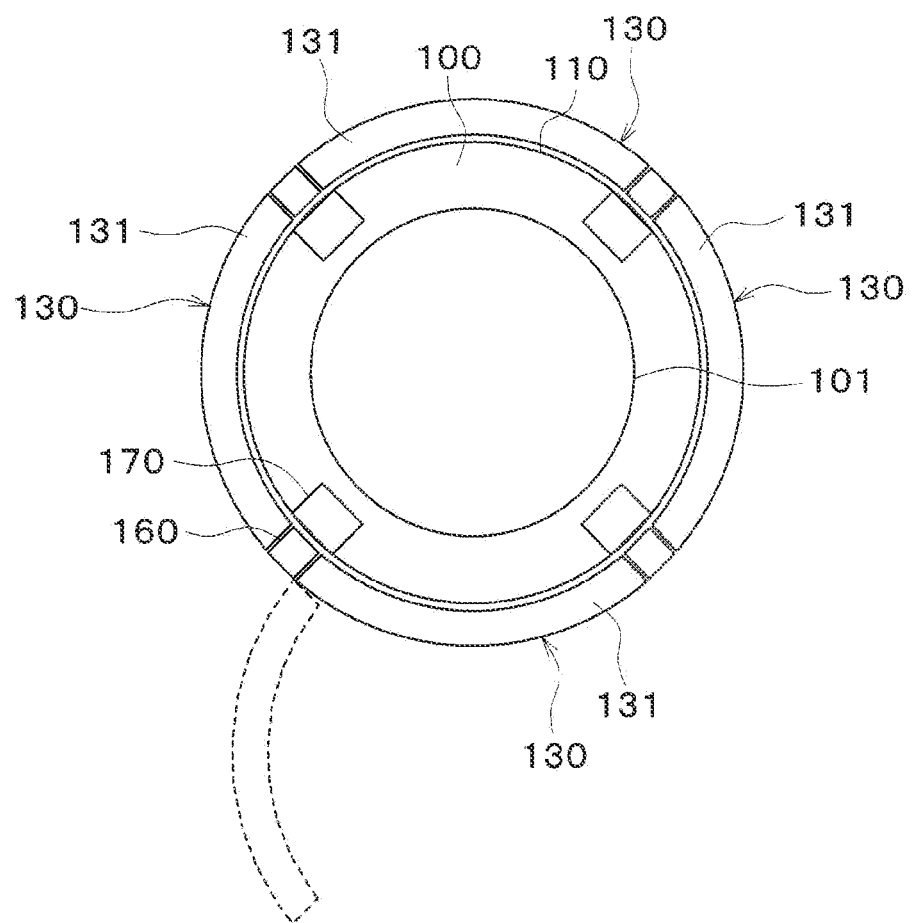
FIG. 12 is an explanatory diagram of a carbon dioxide recovery device of a fourth embodiment.

As shown in FIG. 12, in a carbon dioxide recovery device 10 of the present embodiment, each of the electrochemical cells 101 is shaped in a cylindrical columnar form. In other words, in the view taken in the cell stacking direction of the electrochemical cells 101, each of the electrochemical cells 101 is shaped in a circular form. In conformity with this, an outer shape of the receiver 110 is shaped in a cylindrical columnar form. The base plate 131 of each of the doors 130 is shaped in an arcuate form. When the carbon dioxide recovery device 10 is seen in the cell stacking direction, a curvature of each base plate 131 is the same as a curvature of the outer shape of the receiver 110.

A plurality of outer pillars 160, each of which is shaped in a column form and extends in the cell stacking direction, are placed at the outside of the receiver 110. A corresponding one of the base plates 131 is fixed to each of the outer pillars 160 through an undepicted hinge (s). Therefore, the base plate 131 is configured to be opened and closed about the connection which connects between the base plate 131 and the outer pillar 160.

A plurality of inner pillars 170, each of which is shaped in a column form and extends in the cell stacking direction, are respectively placed at locations which respectively correspond to the outer pillars 160 at the inside of the receiver 110. At the closing time of the doors 130, the doors 130 respectively contact the inner pillars 170, so that a gap between each door 130 and the receiver 110 is sealed.

The number of the outer pillars 160 and the number of the inner pillars 170 are the same as the number of the doors 130. In the present embodiment, each of the outer pillars 160 and the inner pillars 170 is shaped in a rectangular column form.

The rest of the structure of the carbon dioxide recovery device 10 is the same as that of the first embodiment. Therefore, the advantages, which are similar to those of the first embodiment, can be achieved with the carbon dioxide recovery device 10 of the present embodiment. Specifically, with the carbon dioxide recovery device 10 of the present embodiment, the amount of energy required for the carbon dioxide recovery can be reduced.

Other Embodiments

The present disclosure is not limited to the above-described embodiments and may be modified in various ways as follows without departing from the spirit of the present disclosure. Furthermore, the components disclosed in the above embodiments may be suitably combined within a practical extent.

(1) For example, in the embodiments described above, there is described the example, in which in order to limit the sticking of the doors 130 caused by the freezing in the closed state thereof, the operational torque of the electric actuator 134 at the opening time of the door 130 is sensed, and the closing time period of the door 130 is shortened based on the result of this sensing operation. However, the freezing limiting method of the door 130 is not limited to this method.

For example, the carbon dioxide recovery system 1 may be configured such that the doors 130 are not fully closed when the carbon dioxide recovery system 1 is not operated. Specifically, in a state where the doors 130 are slightly opened, the carbon dioxide recovery system 1 may be deactivated. Furthermore, a heat source(s) may be provided to the receiver 110, and the temperature of the heat source(s) may be increased to melt the frozen part. At this time, an electric heater or a high-temperature heat medium may be used as the heat source.

(2) In the third embodiment described above, there is explained the example in which the carbon dioxide recovery device 10 is placed in the environment where the wind always flows in the same direction. For example, the carbon dioxide recovery device 10 may be placed in an environment where the wind direction changes. In this case, a wind direction sensor, which senses the wind direction of the atmospheric gas, may be provided, and the controller unit 14 may determine the subject doors 130 to be opened according to the wind direction detected by the wind direction sensor.

(3) In the embodiments described above, there is described the example, in which the electrolyte liquid 108 in the liquid state is used as the electrolyte material. However, the present disclosure is not limited to this. For example, ionic liquid gel, which is formed by gelling an ion liquid, or a solid electrolyte, which is in a solid state, may be used as the electrolyte material.

(4) In the embodiments described above, there is described the example, in which each of the doors 130 includes: the base plate 131, which is shaped in the plate form; and the support couplers 132, which rotatably support the base plate 131 relative to the receiver 110. However, the structure of the door 130 is not limited to this.

For example, the door 130 may be constructed with a bellows structure. In this case, each of the gas inlets 120 may be closed in a state where the corresponding door 130, which is in the form of bellows, is extended (expanded), and the gas inlet 120 may be opened in a state where the corresponding door 130 is contracted. Furthermore, each of the doors 130 may have a louver structure in which a plurality of plate members are stacked such that plate surfaces of the plate members are parallel to each other, and an angle of the respective plate surfaces is changed to change the amount of circulation of the atmospheric gas.

Figure 13:
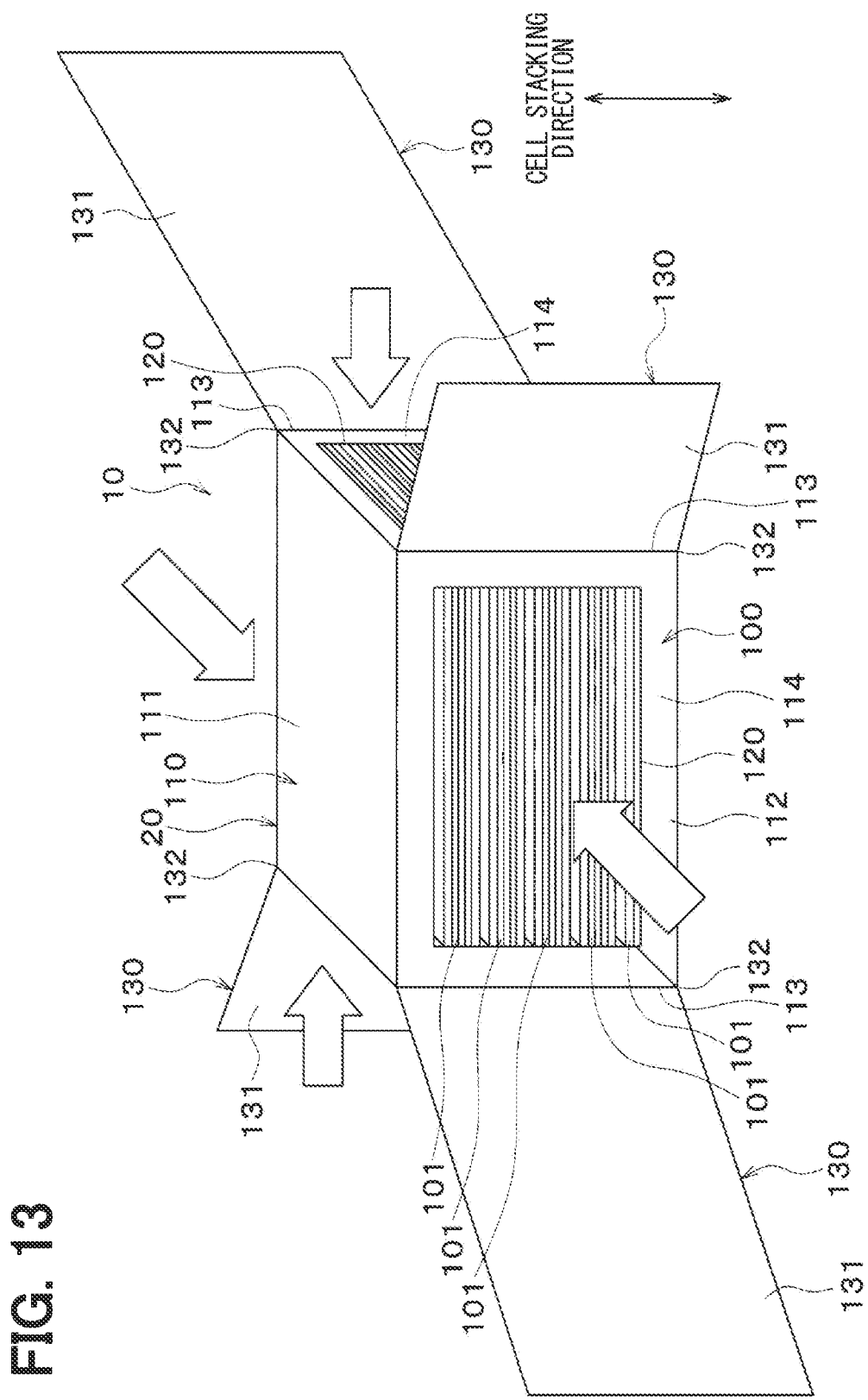
FIG. 13 is a perspective view of a carbon dioxide recovery device of another embodiment.

(5) In the embodiments described above, there is described the example, in which each of the gas inlets 120 is formed through substantially the entire extent of the corresponding one of the side portions 114 at the receiver 110. However, the present disclosure is not limited to this. For example, as shown in FIG. 13, each of the side portions 114 may be shaped in a plate form, and the gas inlet 120 may be opened at a plate surface of the side portion 114. In this case, the plate surface of each side portion 114 forms the corresponding connecting portions 113. Furthermore, along the circumferential direction of the receiver 110 that is perpendicular to the cell stacking direction, the gas inlets 120 are arranged at portions of the receiver 110, which are other than the plate surfaces of the side portions 114.

What is claimed is:

1. A carbon dioxide recovery device that is configured to separate and recover carbon dioxide from a subject gas which contains the carbon dioxide, the carbon dioxide recovery device comprising:

an adsorption unit that includes a plurality of electrochemical cells which are stacked in a cell stacking direction, wherein each of the plurality of electrochemical cells includes:
a working electrode that is configured to adsorb the carbon dioxide from the subject gas and also desorb the carbon dioxide through an electrochemical reaction; and
a counter electrode that is configured to transfer an electron between the counter electrode and the working electrode;
a receiver that receives the adsorption unit;
a plurality of gas inlets, each of which is provided to the receiver and is configured to introduce the subject gas into the receiver; and
a plurality of doors, each of which is configured to open and close a corresponding one of the plurality of gas inlets and includes:
a base plate that is configured to cover the corresponding one of the plurality of gas inlets; and
a support coupler that is configured to support the base plate relative to the receiver, wherein:
the plurality of gas inlets are respectively configured to introduction of the subject gas into the receiver in a corresponding direction perpendicular to the cell stacking direction of the plurality of electrochemical cells and are configured to introduce the subject gas into the receiver from all around the receiver along a circumferential direction of the receiver that is perpendicular to the cell stacking direction of the plurality of electrochemical cells.

2. The carbon dioxide recovery device according to claim 1, wherein along the circumferential direction of the receiver that is perpendicular to the cell stacking direction of the plurality of electrochemical cells, the plurality of gas inlets are respectively arranged at all of circumferential sides of the receiver, which are other than a plurality of portions of the receiver, to each of which the support coupler of a corresponding one of the plurality of doors is coupled.

3. The carbon dioxide recovery device according to claim 1, wherein:
the receiver includes:
a first base portion;
a second base portion which is spaced from the first base portion; and
a plurality of connecting portions, each of which joins between the first base portion and the second base portion;
the support coupler of each of the plurality of doors is provided to a corresponding one of the plurality of connecting portions;
the receiver includes a plurality of side portions, each of which is surrounded by the first base portion, the second base portion and corresponding two of the plurality of connecting portions; and
each of the plurality of side portions has a corresponding one of the plurality of gas inlets.

4. The carbon dioxide recovery device according to claim 3, wherein at a time of opening the plurality of doors, a plate surface of the base plate of each of the plurality of doors is arranged to extend in a direction which extends through a center part of the adsorption unit and is perpendicular to a spacing direction, in which the first base portion and the second base portion are spaced from each other.

5. The carbon dioxide recovery device according to claim 1, comprising a plurality of recovery units, each of which includes:

the adsorption unit;
the receiver; and
the plurality of doors, wherein the plurality of recovery units are arranged in the cell stacking direction of the plurality of electrochemical cells.

6. The carbon dioxide recovery device according to claim 1, wherein in a view taken in the cell stacking direction of the plurality of electrochemical cells, each of the electrochemical cells is shaped in a polygonal form or a circular form.

* * * * *